United States Patent [19]

Wan

[11] 4,345,983

[45] Aug. 24, 1982

[54] METHOD FOR DISPOSAL OF CHEMICAL WASTE

[75] Inventor: Jeffrey K. S. Wan, Kingston, Canada

[73] Assignee: Queen's University at Kingston, Kingston, Canada

[21] Appl. No.: 265,798

[22] Filed: May 21, 1981

[51] Int. Cl.$^3$ .............................................. B01J 19/12
[52] U.S. Cl. ................................. 204/158 R; 210/748
[58] Field of Search ........ 204/158 P, 158 R, 157.11 P; 210/748; 423/437, 493, 580

[56] References Cited

U.S. PATENT DOCUMENTS 3,989,806 11/1976 Hyatt .................................... 423/437
4,140,066 2/1979 Rathjen et al. ...................... 423/481

FOREIGN PATENT DOCUMENTS 2814126 10/1979 Fed. Rep. of Germany ... 204/158 P
50-36112 11/1975 Japan .............................. 204/158 P Primary Examiner—Howard S. Williams
Attorney, Agent, or Firm—Richard J. Hicks; Stanley E. Johnson

[57] ABSTRACT

A process for the safe and efficient disposal of toxic chlorinated hydrocarbon waste materials in which the chlorinated hydrocarbon is brought into close surface contact with a finely divided para- or ferromagnetic material, such as a fluidized bed of iron powder, in the presence of high intensity microwave radiation, so as to effect an electron transfer reaction which yields chloride anions, which subsequently react with the iron to form ferrous chloride, and an organic radical which is readily oxidized, in the presence of gaseous oxygen, to carbon dioxide and water.

8 Claims, No Drawings

METHOD FOR DISPOSAL OF CHEMICAL WASTE

BACKGROUND OF THE INVENTION

This invention relates to a process for disposing of waste chlorinated hydrocarbons safely and efficiently, and more particularly to the disposal of polychlorinated biphenyls (PCBs).

The many attractive physical and chemical properties of PCBs, such as low melting points, low flammability, low volatility and high stability to bio- and chemical degradation, have resulted in their widespread use as insulating materials in electrical equipment, heat exchange liquids, plasticizers and many other industrial applications. PCBs have thus become widely distributed throughout the environment, as well as many parts of the biosphere, including humans. While the general toxic effects of human exposure to PCBs and other chlorinated hydrocarbons are still somewhat uncertain, it is known that dermatologic, neurologic and enzymatic disorders can be caused by exposure to PCBs, and therefore every effort must be made to limit the dissemination of the materials through the environment. Because of the very nature of PCBs, i.e. high stability to bio- and chemical degradation, safe disposal of waste PCBs is an extremely difficult problem and one to which a solution is urgently required as environmental regulations presently call for the stockpiling of PCB wastes pending development of a safe disposal method.

High energy gaseous phase chemical breakdown of PCBs by bombarding the molecules with high energy electrons (plasma) has been reported but, as the process is effected in the gaseous phase, the energy requirements are extremely high, firstly to vaporize the low-volatile chlorinated hydrocarbons and secondly to produce a plasma at normal pressure which requires a very high voltage to obtain the discharge. Further, the reaction initially leads to the production of chlorine anions in the gas phase which are not immediately trapped to form salts. The reactive chlorine anions in the gas phase are, therefore, free to produce other chlorinated species which may be almost as harmful as the PCBs from which they derive.

OBJECT OF THE INVENTION

The object of the present invention is to provide a safe and efficient method for disposal of chlorinated hydrocarbons, particularly PCBs by chemical reaction, in the solid or liquid phases, with roughened metallic surfaces under the influence of high power microwaves.

Thus, by one aspect of this invention there is provided a process for disposal of chlorinated hydrocarbons comprising:

effecting intimate contact between said chlorinated hydrocarbon and a para- or ferromagnetic material surface; and subjecting said intimately contacted chlorinated hydrocarbon and para- or ferromagnetic material surface to microwave radiations, in the presence of a free oxygen containing gas so as to produce chloride anions and oxidation products of organic moieties of said chlorinated hydrocarbons.

DETAILED DESCRIPTION

While this invention will be described with particular reference to iron powders, it will be appreciated that the principles described herein are applicable to any ferromagnetic or paramagnetic metallic material. It is well known that metallic iron powder has a very high and rough surface area and that iron interacts or absorbs strongly with microwave radiations in the 1.5-3 GHz and preferably 2 GHz region (ferromagnetic absorption). Thus, using a high intensity microwave radiation at about 4 kW, the classical electromagnetic field on the metal surface is approximately $8 \times 10^4$ V cm$^{-1}$. The kinetic energy of the free electrons on the metal surface is further enhanced by the oscillating incident electrical field at 2 GHz. It is also known that, when catalysed by an appropriate metal surface under suitable conditions, chemical reactions proceed extremely quickly.

It has now been found that chlorinated hydrocarbons are adsorbed by metallic powders, particularly rough surfaced iron powders. Upon irradiation of the metallic powder and adsorbed hydrocarbon with high intensity microwaves, the organic substrates do not adsorb the incident light but the microwave radiation greatly enhances the kinetic energy of the free electrons on the metal surface. When those electrons acquire sufficient kinetic energy, i.e. when they reach a certain plasmon mode, chemical reactions occur by electron transfer from the metal surface to the organic substrate. In the case of chlorinated hydrocarbons, the electron transfer process takes the form of a very rapid dechlorination process yielding a chloride anion and an organic radical. In the presence of oxygen or other free oxygen-containing gas, the organic radical will initiate a chain oxidation process resulting in the complete breakdown of the organic moiety to yield carbon dioxide and water. The chloride anions produced in the primary electron transfer reaction will react with the iron powder which heretofore has been a catalyst in the reactions to form ferrous chloride. Ferrous chloride and other metal chlorides such as sodium chloride are readily soluble in water and can therefore readily be separated from the unreacted mass of iron (or other metal) powder. The overall general reaction may be represented by:

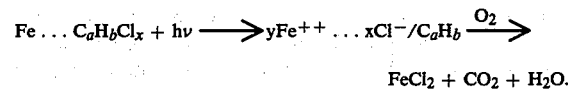

$$FeCl_2 + CO_2 + H_2O.$$

It will be appreciated that the processes of the present invention depend, in part, on the available surface area of the iron or other metal powders and for this reason it is preferred that the reactions should take place in a fluidized bed. Several suitable microwave fluidized beds are known to the art. In order to demonstrate the process of the present invention on a laboratory scale the following test examples were carried out using pentachlorophenol which is a precursor of the highly toxic dioxin, and tetrachlorobiphenol which is a metabolite of the corresponding PCB and known to be several times more toxic than PCBs. Both may be regarded as typical chlorinated aromatic hydrocarbons and both require great care in handling.

EXAMPLE 1

1 g of tetrachlorobiphenol was mixed with 2 g of iron powder in a Pyrex ® text tube. The tube was filled with pure oxygen at 1 atmosphere pressure, sealed with a metal valve, and placed in a 4 kW microwave irradiator operating at 2 GHz. The irradiator was operated in the pulsed mode with an on-time of 10 seconds and an off-time of 35 seconds. A total of 50 seconds irradiation time was allowed. After irradiation the sample was visually inspected and showed "tar" and a brownish/green sheen typical of iron chlorides. The gas inside the sample tube was subjected to mass spectrometric analysis which, under very high sensitivity, failed to show any trace of organic substrates. The only gas product observed was carbon dioxide as water cannot be quantitatively determined by mass spectrometry. The solid in the tube was treated with 5 ml warm distilled water and filtered. Addition of silver nitrate solution to the filtrate resulted in the precipitation of silver chloride, confirming iron chloride in the solid product. The water-insoluble solid was dried and treated with carbon tetrachloride when all the iron powder was removed and the filtrate evaporated to dryness the white residue was analysed by n.m.r. in $CCl_4$ solvent and shown to be unreacted original substrate. It was estimated that $60\pm10\%$ of the original chlorinated hydrocarbon had been converted to harmless products.

EXAMPLE 2

The procedure of Example 1 was repeated without microwave irradiation and no decomposition of the chlorinated hydrocarbon was observed.

EXAMPLE 3

1 g of pentachlorophenol was mixed with 2 g of iron powder in a Pyrex ® tube. The tube was filled with oxygen at 1 atmosphere pressure and sealed with a plastic film. The sealed tube was then irradiated as in Example 1 and the products were treated and analysed according to the procedures outlined in Example 1. Iron chloride was again confirmed and recovery of organic materials in the iron powder showed the presence of 20-30% unreacted pentachlorophenol.

EXAMPLE 4

Example 3 was repeated without microwave irradiation and no decomposition of the pentachlorophenol was observed. 60% Decomposition of the chlorinated hydrocarbons in Examples 1 and 3 is considered exceptionally high bearing in mind the batch nature of the tests, and offers clear indication that a continuous flow of oxygen coupled with a fluidized bed to maximize the surface contact effect would improve the efficiency of the process to near unity.

I claim:
1. A process for disposal of chlorinated hydrocarbons comprising:
   effecting intimate contact between a para- or ferromagnetic material surface and a solid or liquid phase chlorinated hydrocarbon;
   subjecting said intimately contacted surface to microwave radiations in the range 1.5–3 GHz so as to generate a high intensity oscillating electrical field at said surface and so as to produce, in the presence of a free oxygen containing gas, chloride ions and oxidation products of organic moieties of said chlorinated hydrocarbons.
2. A process for disposal of chlorinated hydrocarbons comprising:
   adsorbing a solid or liquid phase chlorinated hydrocarbon onto a finely divided para- or ferromagnetic material surface;
   subjecting said material surface with adsorbed said chlorinated hydrocarbon to microwave radiations in the range 1.5–3 GHz so as to generate a high intensity oscillating electrical field and so as to produce, in the presence of a free oxygen-containing gas, chloride ions and oxidation products of organic moieties.
3. A process as claimed in claim 1 wherein said intimately contacted surface is formed in a fluidized bed of finely divided said material.
4. A process as claimed in claim 1 or 2 wherein said ferromagnetic material is a fluidized bed of iron powder.
5. A process as claimed in claim 1 or 2 wherein said ferromagnetic material is iron and said free oxygen containing gas is oxygen.
6. A process as claimed in claim 1 or 2 wherein said chlorinated hydrocarbon is an aromatic chlorinated hydrocarbon selected from the group consisting of poly chlorinated biphenyls and precursors and metabolites thereof.
7. A process as claimed in claim 1 or 2 wherein said chloride anions react with said material so as to form a water soluble chloride.
8. A process as claimed in claim 1 or 2 wherein said material is iron powder and wherein said chloride anions react therewith so as to form ferrous chloride.

* * * * *